(12) United States Patent
Jia et al.

(10) Patent No.: US 8,390,932 B2
(45) Date of Patent: Mar. 5, 2013

(54) DEVICE FOR ACQUIRING EQUALLY BLURRED INTERMEDIATE IMAGES

(75) Inventors: Wei Jia, Beijing (CN); Yefeng Zhou, Beijing (CN)

(73) Assignee: Typonteq Company, Beijing (CN)

( * ) Notice: Subject to any disclaimer, the term of this patent is extended or adjusted under 35 U.S.C. 154(b) by 202 days.

(21) Appl. No.: 13/025,714

(22) Filed: Feb. 11, 2011

(65) Prior Publication Data

US 2012/0063008 A1 Mar. 15, 2012

Related U.S. Application Data

(63) Continuation-in-part of application No. PCT/CN2009/000941, filed on Aug. 17, 2009.

(30) Foreign Application Priority Data

Aug. 15, 2008 (CN) ............ 2008 1 0118437
May 13, 2009 (CN) ............ 2009 1 0136679

(51) Int. Cl.
*G02B 3/00* (2006.01)
*G02B 3/02* (2006.01)
*G02B 3/10* (2006.01)
(52) U.S. Cl. .............. 359/642; 359/708; 359/721
(58) Field of Classification Search .......... 359/642, 359/708, 721
See application file for complete search history.

(56) References Cited

U.S. PATENT DOCUMENTS

| | | | |
|---|---|---|---|
| 5,748,371 | A | 5/1998 | Cathey, Jr. et al. |
| 6,911,638 | B2 | 6/2005 | Dowski, Jr. et al. |
| 7,336,430 | B2 | 2/2008 | George et al. |
| 7,511,895 | B2 | 3/2009 | George et al. |
| 7,593,161 | B2 | 9/2009 | George et al. |
| 2007/0279618 | A1 | 12/2007 | Sano et al. |

FOREIGN PATENT DOCUMENTS

| | | |
|---|---|---|
| CN | 101048691A A | 10/2007 |
| CN | 101080742A A | 11/2007 |
| WO | WO-2008/129541 A2 | 10/2008 |

OTHER PUBLICATIONS

International Search Report for PCT/CN2009/000941, ISA/CN, Beijing, mailed Nov. 26, 2009.

*Primary Examiner* — Jack Dinh
(74) *Attorney, Agent, or Firm* — Harness, Dickey & Pierce, P.L.C.

(57) ABSTRACT

A device for acquiring equally blurred intermediate image to realize Extension of DOF imaging is characterized in that: the lens of said device produces space-invariant and approximately equal psf output in the designed range of the depth-of-field; the lens realizing space-invariant transfer characteristic is a multi-focal points lens with ray compensation; the angle of the ray guided by the multi-focal point changes in response to the object distance, but the corresponding position and energy distribution of the light spot on the image surface remain constant substantially.

23 Claims, 7 Drawing Sheets

US 8,390,932 B2

DEVICE FOR ACQUIRING EQUALLY BLURRED INTERMEDIATE IMAGES

CROSS-REFERENCE TO RELATED APPLICATIONS

This application is Continuation in Part of International Application No. PCT/CN2009/000941, filed Aug. 17, 2009. This application claims the benefit of Chinese Patent Application Nos. CN 200810118437.X, filed Aug. 15, 2008; and CN 200910136679.6, filed May 13, 2009. The disclosures of the above applications are entirely incorporated herein by reference.

FIELD OF THE INVENTION

The present invention relates to the fields of optics and image processing technology, particularly to an image acquiring system and an image acquiring method.

BACKGROUND OF THE INVENTION

Current optical imaging systems are pure optical systems which use optical focusing as a basic technology to image objects directly. One of the characteristics of the current optical system is its relatively limited depth-of-field (DOF), which causes the image of an object out of DOF blurred, and thus the content of image information is not sufficient. The reason is that the current optical imaging systems are linear space variant systems, and the imaging response of the system is strongly relevant to object distances.

An optical imaging system is disclosed in the U.S. Pat. No. 5,748,371A of CDM Optics inc. and its successor. A wavefront coding device disclosed in U.S. Pat. No. 5,748,371A, i.e., a wavefront coding mask component, is a core technology of patents related to wavefront coding owed by CDM Optics INC. The wavefront coding mask device is a phase mask which is constructed by orthogonalizing two odd continuous curved lines or by rotating said lines by 180°. The drawback of the wavefront coding mask component lies in its asymmetry and the high cost in manufacturing and assembling as well as the distorted imaging position of scenery from the ends of DOF caused by the asymmetry.

The international application WO2008/129541A2 of Tel-Aviv university from Israel discloses a wavefront coding device, which is characterized in that a phase mask of the wavefront coding device is based on at least one rotational symmetrical curved surface and includes at least one rotational symmetrical curved surface part for wavefront phase coding and one rotational symmetrical shutter surface part for amplitude coding. The technology is very complicated and causes a high cost in manufacturing.

SUMMARY OF THE INVENTION

In order to overcome the drawbacks of the prior art, the present invention provides a new device for acquiring equally blurred intermediate images, which differs from the conventional wavefront coding technology in that the present invention provides a solution for achieving equally blurred intermediate images by defining a focal point structure and symmetric surface of wavefront coding device.

In accordance with the present invention, a device for acquiring equally blurred intermediate images is provided, which comprises a focusing imaging lens and a phase mask positioned at an aperture stop of the focusing imaging lens. The device is characterized in that, the device is able to produce an approximately equal point-spread function (psf) output with a space-invariant characteristic in a designed range of depth-of-field; the device realizing the space-invariant transferring characteristic comprises a multi-focus focusing lens with ray compensation characteristic; angles of rays guided by the multi-focus lens change in response to object distances, whereas a corresponding position and energy distribution of a light spot on an image plane of the device remain substantially invariant.

Wherein, a curved surface of the phase mask is an even symmetric curved surface constructed on the basis of a curved line which is even symmetric with respect to an optical axis.

Wherein, a focal point structure of the device can be described as a focal point track within any section along a chief ray, the focal point track is characterized as a continuous track or a discrete track or a combination of continuous track and discrete track and is shaped to have a characteristic of a character "X" which has four focal point track segments divided by a central crossing point.

Wherein, a focal point structure of the device can be described as a focal point track within any section along a chief ray, the focal point track is characterized as a continuous track or a discrete track or a combination of continuous track and discrete track and is shaped to have a characteristic of a character "⋀" rotated counterclockwise or clockwise by 90°.

Wherein, a curved surface equation of the phase mask is described as a curved surface equation which is obtained, on the basis of two-dimensional curved lines, by multiplying two orthogonal two-dimensional curved line equations in an orthogonal coordinate system while appropriately scaling the two curved line equations in amplitudes/dimensions, and the curved surface represented by the curved surface equation within a definition domain of the aperture stop is the curved surface of the phase mask.

Wherein, the two-dimensional curved lines are $z(x)=f(x)=f(-x)$, $z(y)=g(y)=g(-y)$, and the obtaining of the curved surface equation by multiplying two orthogonal curved line equations in the orthogonal coordinate system while appropriately scaling in amplitudes/dimensions comprises the following:

a curved surface equation $$z_{ty}(x, y) = k(y)f\left(\frac{x}{l(y)}\right)m(x)g\left(\frac{y}{n(x)}\right)$$

is obtained by multiplying two orthogonal curved line equations $z(x)=f(x)$, $z(y)=g(y)$ in the orthogonal coordinate system while appropriately scaling using amplitude/dimension scaling functions $k(y)$, $l(y)$, $m(x)$, $n(x)$ with corresponding variables y and x, where $k(y)$, $l(y)$, $m(x)$, $n(x)$ are amplitude/dimension scaling even functions with corresponding variables y and x.

Wherein, the curved surface of the phase mask is an end-to-end connected and continuous curved surface which is obtained, on the basis of a two-dimensional curved line, by appropriately scaling the curved line in a polar coordinate system in amplitude/dimension at different angles while rotating by 180°, and a portion of the continuous curved surface within the definition domain of the aperture stop is the curved surface of the phase mask.

Wherein, the two-dimensional curved line is $z(r,\phi_0)=f(r,\phi_0)+f(r,\phi_0+\pi)$, $\phi_0$ is an angle constant, the obtaining of the end-to-end connected and continuous curved surface by appropriately scaling the radial curved line in the polar coordinate system in amplitude/dimension at different angles while rotating by 180° comprises the following:

an end-to-end connected and continuous curved surface $$z_{ty}(r,\varphi) = k(\varphi)f\left(\frac{r}{l(\varphi)},\varphi\right) + k(\varphi+\pi)f\left(\frac{r}{l(\varphi+\pi)},\varphi+\pi\right)$$

is obtained by scaling the radical curved line $z(r,\varphi_0)=f(r,\varphi_0)+f(r,\varphi_0+\pi)$ in the polar coordinate system using amplitude/dimension scaling functions with an angle variable $\varphi$ while rotating said line by 180°, wherein, $k(\varphi)=k(\varphi+\pi)$, $l(\varphi)=l(\varphi+\pi)$ are scaling functions with an angle variable $\varphi$ and a period of $\pi$, and $\pi$, and $0 \leq \varphi < \pi$.

Wherein, the two-dimensional curved lines $z(x)=f(x)$, $z(y)=f(y)$ are even curved lines which are even symmetrical with respect to ZOY and ZOX planes, the phase mask with the curved surface defined by $$z_{ty}(x,y) = k(y)f\left(\frac{x}{l(y)}\right)m(x)g\left(\frac{y}{n(x)}\right)$$

can be designed together with the focusing imaging lens, and achieve the function of focusing and phase masking in form of an aspheric lens.

Wherein, the two-dimensional curved line $z(r,\varphi_0)=f(r,\varphi_0)+f(r,\varphi_0+\pi)$ is an axially even function curved line, $\varphi_0$ is an angle constant, the phase mask with the curved surface defined by $$z_{ty}(r,\varphi) = k(\varphi)f\left(\frac{r}{l(\varphi)},\varphi\right) + k(\varphi+\pi)f\left(\frac{r}{l(\varphi+\pi)},\varphi+\pi\right)$$

can be designed together with the focusing imaging lens, and achieve the function of focusing and phase masking in form of an aspheric lens.

Wherein, the two-dimensional curved line comprises a continuous curvature curved line, a discrete curvature curved line, or a combination of continuous curvature curved line segments and one or more discrete curvature curved line segments.

Wherein, each of the discrete curvature curved line segments has a fixed and unique curvature.

Wherein, the curvatures of neighboring segments among the discrete curvature curved line segments may be identical or different, and may be negative or positive.

Wherein, in a polar coordinate system the surface is expressed by the following:

$$z(r,\varphi) = \frac{c \cdot r^2}{1+\sqrt{1-c^2 \cdot r^2}} + z_{ty}(r,\varphi)$$

$$z_{ty}(r,\varphi) = \sum_{i=1}^{n}\left\{\left[z_{rgi}(\varphi) \cdot \left[\cos\left(\begin{array}{c}pd_i(\varphi) \cdot \frac{r-r_{i-1}(\varphi)}{r_{rgi}(\varphi)} \cdot \\ 2\pi - ph_i(\varphi) \cdot 2\pi \\ \cos(ph_i(\varphi) \cdot 2\pi)\end{array}\right) - \right] + z_{ty}(r_{i-1},\varphi)\right] \cdot \{u[r(\varphi)-r_{i-1}(\varphi)] - u[r(\varphi)-r_i(\varphi)]\}\right\}$$

wherein, each of functions $z_{rgi}(\varphi)$, $pd_i(\varphi)$, $r_{i-1}(\varphi)$, $r_{rgi}(\varphi)$, $phi_i(\varphi)$, $r_i(\varphi)$ is a continuous function of $\varphi$, $0 \leq \varphi < 2\pi$;

and wherein, $z(r,\varphi)$ is a vector height along z axis of the curved surface at $(r,\varphi)$, $\varphi$ is an angle variable of the curved surface, r is an axial length variable of the curved surface, and $0 \leq r \leq r_m$, $r_m$ is the radius of the aperture stop, $z_{rgi}(\varphi)$ is an axial amplitude of the ith cosine curved line segment at $\varphi$, $r_{rgi}(\varphi)$ is a radial length of the ith cosine curved line segment at $\varphi$, $r_i(\varphi)$ is a radius of the outer edge of the ith cosine curved line segment at $\varphi$, $r_0(\varphi)$ equals to zero, $pd_i(\varphi)$ is a periodic coefficient of the ith curved surface, $ph_i(\varphi)$ is an initial phase coefficient of the ith curved surface, c is the curvature of the basic spherical surface, $u(r-r_i(\varphi))$ is a radial step function with a starting point $(r_i(\varphi), \varphi)$, n is the number of the radically divided segments of the cosine curved line, i is the sequence number of the segment.

Wherein, $pd_i(\varphi)$ and $r_i(\varphi)$ may both be constant.

Wherein, in the orthogonal coordinate system the surface is expressed by the following:

$$z(x,y) = \frac{c \cdot (x^2+y^2)}{1+\sqrt{1-c^2 \cdot (x^2+y^2)}} + z_{ty}(x,y)$$

$$z_{ty}(x,y) = z_{ty}(x_{i-1},y_{j-1}) + \sum_{i=1}^{m}\left\{z_{rgi}(y) \cdot \left[\cos\left(\begin{array}{c}pd_i(y) \cdot \frac{|x|-|x_{i-1}(y)|\text{sgn}(x)}{x_{rgi}(y)} \cdot \\ 2\pi - ph(y)_i \cdot 2\pi \\ \cos(ph_i(y) \cdot 2\pi)\end{array}\right) - \right] \cdot [u(|x|-|x_{i-1}(y)|\text{sgn}(x)) - u(|x|-|x_i(y)|\text{sgn}(x))]\right\} +$$

$$\sum_{j=1}^{n}\left\{z_{rgi}(x) \cdot \left[\cos\left(\begin{array}{c}pd_j(x) \cdot \frac{|y|-|y_{j-1}(x)|\text{sgn}(y)}{y_{rgi}(x)} \cdot \\ 2\pi - ph_j(x) \cdot 2\pi \\ \cos(ph_j(x) \cdot 2\pi)\end{array}\right) - \right] \cdot [u(|y|-|y_{j-1}(x)|\text{sgn}(y)) - u(|y|-|y_j(x)|\text{sgn}(y))]\right\}$$

wherein, $z(x,y)$ is a z axial vector height of the curved surface at $(x,y)$, $(x,y)$ is a coordinate point within the aperture stop, and $$x_{-max}(y) \leq x(y) \leq x_{+max}(y), \quad y_{-max}(x) \leq |y(x)| \leq y_{+max}(x),$$

$x_{-max}(y)$, $x_{+max}(y)$, $y_{-max}(x)$, $y_{+max}(x)$ are outer boundary functions of the aperture stop, $z_{rgi}(y)$ is an x axial amplitude of the ith cosine curved line segment at y, $x_{rgi}(y)$ is a length of the ith cosine curved line segment at y, $|x_i(y)|$ is the absolute value of the outer end point of the ith cosine curved line segment at y, $pd_i(y)$ is an x axial periodic coefficient of the ith curved surface segment at y, $ph_i(y)$ is an x axial initial phase coefficient of the ith curved surface segment at y, c is the curvature of a basic spherical surface, $u(|x|-|x_i(y)|\text{sgn}(x))$ is a combination of two step functions which are $u(x-x_i(y))$ while $x_i(y)>0$ and $u(x+x_i(y))$ while $x_i(y)<0$, m is the number of the divided segments of the curved surface along the positive direction of x axis, i is the sequence number of the segment, sgn(x) is a sign function;

in y axis direction, $z_{rgj}(x)$ is an axial amplitude of the jth cosine curved line segment at x, $y_{rgi}(x)$ is a length of the jth cosine curved line segment at x, $|y_j(x)|$ is the absolute value of the y coordinate of the outer end point of the jth cosine curved line segment at x, $pd_j(x)$ is a periodic coefficient of the jth curved surface segment at x, $ph_j(x)$ is an initial phase coefficient of the jth curved surface segment at x, $u(|y|-|y_j(x)|$ sgn(y)) is a combination of two step functions which are $u(y-y_j(x))$ while $y_j(x)>0$ and $u(y+y_j(x))$ while $y_j(x)<0$, n is the number of the divided segments of the curved surface along the positive direction of y axis, j is the sequence number of the segment, sgn(y) is a sign function.

Wherein, the surface of the phase mask is a curved surface $$z(r, \varphi) = k(\varphi) f\left(\frac{r}{l(\varphi)}\right) [u(\varphi + \pi) - y(\varphi)],$$

which is constructed by rotating a curved line of discrete curvatures or a compound line of discrete and continuous curvatures $z(r)=f(r)\mathrm{sgn}(r)$, which is odd symmetric with respect to the z axis, by 180°, wherein, sgn(r) is a sign function, $u(\phi)$ is a step function, $0 \leqq \phi < \pi$, $k(\phi)$, $l(\phi)$ are scaling coefficient functions with $\phi$ as a variable.

Wherein, the surface of the phase mask is a curved surface $$z_{ty}(x, y) = k(y) f\left(\frac{x}{l(y)}\right) m(x) g\left(\frac{y}{n(x)}\right),$$

which is constructed on the basis of curved lines $z(x)=f(x)=-f(-x)$ and $z(y)=g(y)=-g(-y)$, said lines have discrete curvatures or a compound of discrete and continuous curvatures and are odd symmetric within the xoz and yoz planes respectively, wherein, k(y), l(y), m(x), n(x) are scaling coefficient functions with y, x as variables.

Wherein, the focal point structure of the device, within sections in the xoz and yoz planes, is a discrete track or a combination of partly continuous track and partly discrete track, and is shaped to have a characteristic of a character "/\".

Wherein, the surface of the phase mask comprises a discrete curvature curved surface constructed on the basis of a discrete curvature curved line, or a curved surface constructed based on combination of discrete curvature curved line segments and continuous curvature curved line segments.

DETAILED DESCRIPTION OF THE EMBODIMENTS

Figure 1:
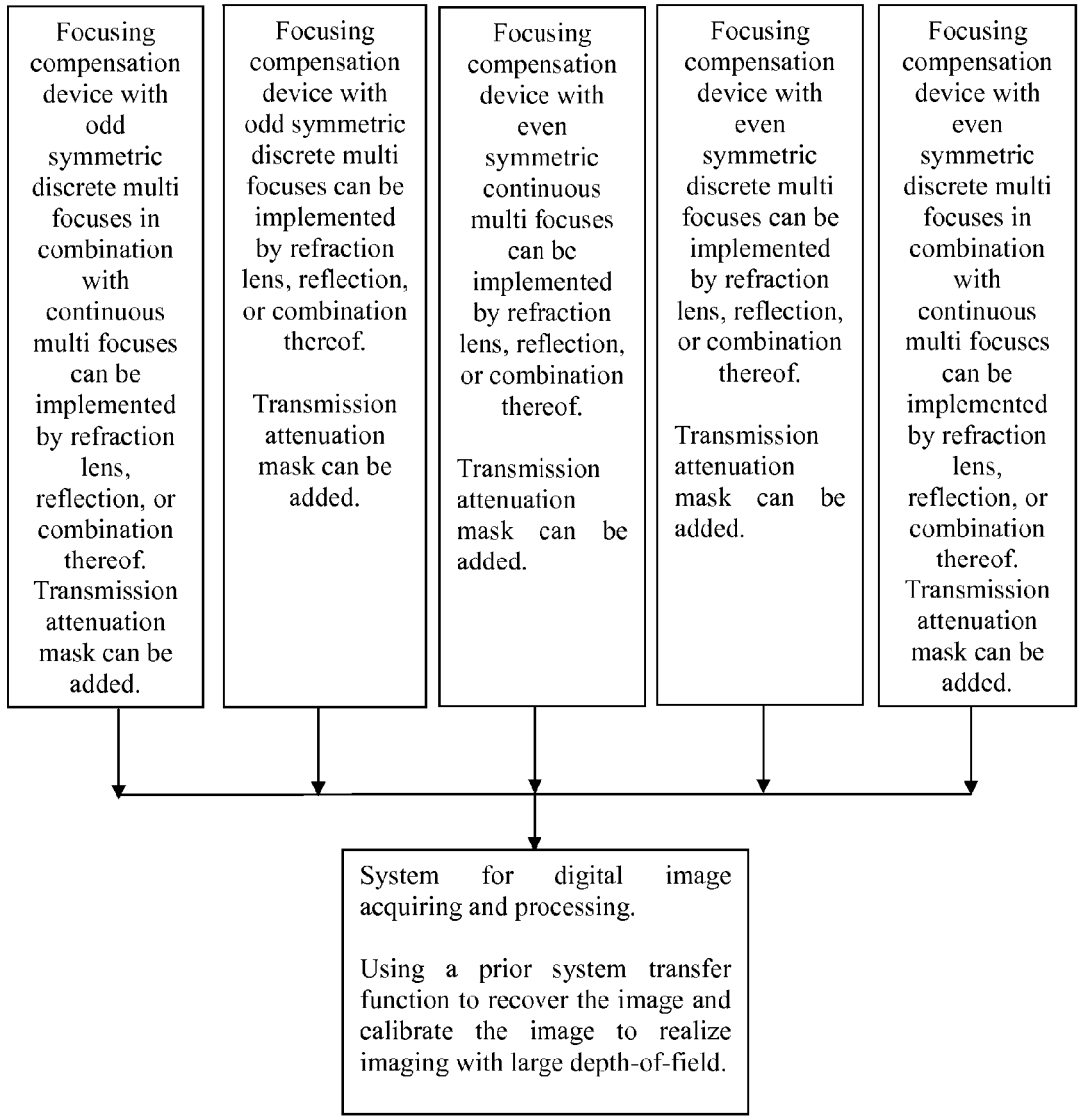
FIG. 1 is a schematic principle diagram of various devices for acquiring equally blurred intermediate images and systems thereof according to an embodiment of the present invention.
Figure 2:
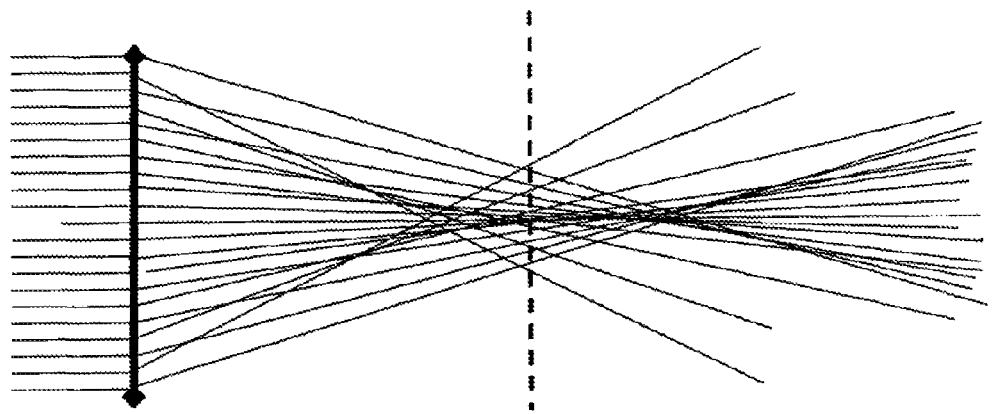
FIG. 2 is a schematic diagram of a focal point track of a multi-focus lens according to an embodiment of the present invention.
Figure 3:
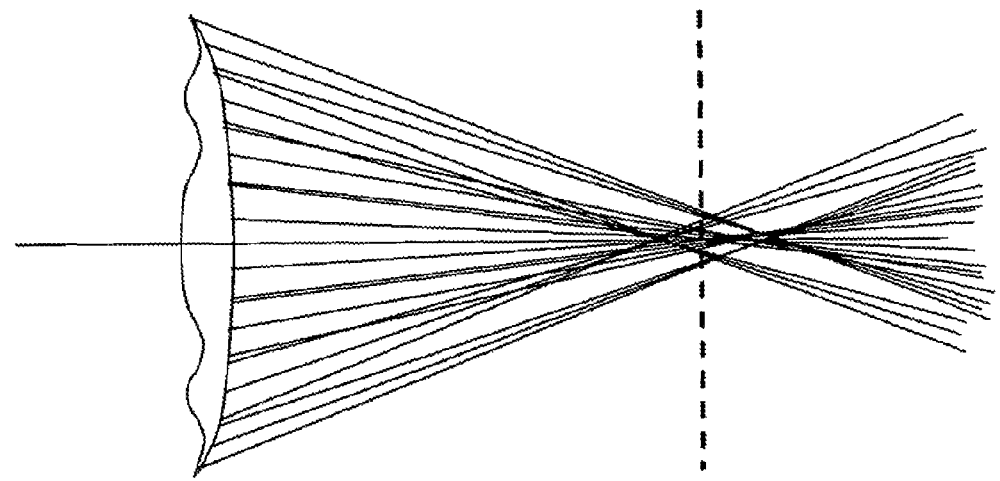
FIG. 3 is a schematic diagram of a discrete multi-focus lens according to an embodiment of the present invention.

Specific embodiments of the present invention will be described below in more detail with reference to the accompanying drawings and exemplary embodiments. The following embodiments serve to explain the present invention, but should not be construed to limit the scope of the present invention.

The present invention proposes several concepts as follows.

DOF of blurred image: it is a concept with respect to the DOF of sharp imaging; DOF of blurred image refers to the range of object distances within which a non-point psf in the image space can be generated with respect to a point light source in the object space. In the whole range of object distances, the DOF of blurred image is complementary to the DOF of sharp image.

DOF of Equally blurred image: DOF of equally blurred image refers to a range of DOF of blurred image within which approximately equal psfs on the image plane can be generated with respect to the point light sources thereof.

Focal point track: the focal point track refers to the track of cross points of neighboring light rays along the radial direction of an aperture stop, said light rays are from the same object point and are guided by the multi-focus lens.

Focal point structure: the focal point structure refers to the structure or shape of the focal point track.

Axial vector height: it is represented as $z_{ty}(x, y)$, $z_{ty}(r,\phi)$ or $z_{ry}$, and refers to the z axial value of a point on the phase mask or the curved surface of a lens in an optical system, and is a phase mask surface function or a len surface function in the optical system.

Focusing imaging platform system: it refers to the conventional single focal point imaging system, and is usually composed of several lenses.

The present invention differs from the conventional wavefront coding extension of depth-of-field (EDOF) technology in that the present invention obtains a new design scheme of wavefront coding device by analyzing the focusing imaging essence of EDOF technology. More specifically, a first innovation point is that the curved surface of the wavefront coding device, i.e., a phase mask, is an even symmetric curved surface constructed on the basis of a curved line which is even symmetric with respect to the optical axis, wherein said even symmetric curved surface includes two cases: an even symmetric curved surface constructed based on a curved line being even centrosymmetric with respect to the z axis, and an even symmetric curved surface constructed based on a curved line being even symmetric within the xoz and yoz planes. A second innovation point is that the curved surface of the wavefront coding device, i.e., the phase mask, is an odd symmetric curved surface constructed on the basis of a curved line with discrete curvatures which is odd symmetric with respect to z axis or an odd symmetric curved surface constructed on the basis of a curved line with discrete curvatures which is odd symmetric with respect to xoz and yoz planes.

The conventional wavefront coding EDOF technology is an incoherent light digital imaging technology. The essence of this technology is the use of a phase mask, whose surface shape is based on a continuous two-dimensional orthogonal odd function curved surface, and a focusing platform system to acquire equally blurred intermediate images on the image plane constructed by an electronic sensor such as CCD or CMOS. Then the equally blurred intermediate images are processed within an image processing device to obtain sharp images with bigger DOF, by using a prior psf of an image processing system and a digital image processing algorithm.

The physical essence of the device for acquiring equally blurred intermediate images is analyzed below.

There are many ways to generate equally blurred intermediate images. However, such ways should conform to certain rules. The present invention is to describe the rules in detail. In order to realize equally blurred intermediate images which are insensitive to object distances, there is a need to make focusing rays have the characteristic of mutual compensation in positions and energy when object distances vary. The effect of the compensation is that the focused light spot is insensitive to the variation of object distances of scenarios within the range of the designed DOF, so that a space-invariant characteristic of the imaging system is realized. The core of the present invention is to provide a series of new methods for designing a wavefront coding optical imaging device to realize multi-focus lens or a device to acquire equally blurred intermediate images with optical compensation function, wherein when object distances increase/decrease, the multi-focus lens makes all rays diverge/converge with respect to the optical axis. Since the angles of rays guided by focal point groups are different, the compensation for positions and irradiation intensities of the rays projected on the image plane are achieved. The compensation result is that within the range of designed DOF the energy distribution of the entire light spot on the image plane scarcely changes with the variation of object distances. More specifically, approximately uniform psf output is obtained with respect to point light sources at varied object distances within the range of designed DOF obtain.

The classification for the position of focal point track of the multi-focus lens and the features of surface shape of the multi-focus lens are described below.

A phase mask provided at an aperture stop controls the aberration of each field of view of a focusing system, or in other words, a mask is combined with a focusing imaging platform system to create a multi-focus imaging system. The rays for imaging in the multi-focus imaging system compensate each other with the variation of object distances, so that the mutual compensation of the rays can be achieved. The focal point group structures of the imaging system are classified into the following four types, as the characteristics shown in FIGS. 4 and 5, wherein FIG. 4 shows the characteristic of even symmetric focal point groups, and FIG. 5 shows the characteristic of odd symmetric discrete focal point groups.

Figure 4:
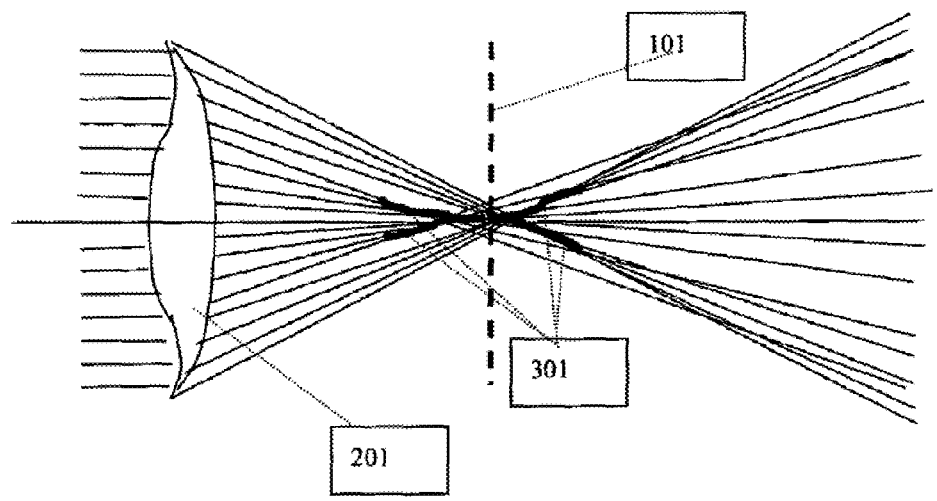
FIG. 4 is a schematic diagram of a continuous focal point group structure with an "X" shape.

In FIG. 4, 201 represents a combination of a focusing imaging platform system and a continuous multi-focus equally blurred mask. Wherein, 101 represents the schematic position of the image plane, 301 represents the structure of the focal point groups. The focal point structure appears to have an "X" shape distributed in the four quadrants constituted by the optical axis and the image plane. FIG. 4 illustrates a case of zero field angle incidence rays. In the case of non-zero field angle incidence rays, the focal point structure appears to have an "X" shape distributed in the four quadrants in an oblique coordinate system which is constituted by the chief rays and the image plane. The focal point structure is separated by the image plane into an inner focal point group and an outer focal point group. The outer end of the inner focal point group corresponds to the end of a focusing convex curved surface that is most distant from the optical axis, and the inner end of the inner focal point group corresponds to the center of the focusing convex curved surface; the outer end of the outer focal point group corresponds to the end of the focusing concave curved surface that is most distant from the optical axis, and the inner end of the outer focal point group corresponds to the end of the focusing concave curved surface that is closest to the optical axis. Wherein, the distances from the convex or concave curved surfaces to the optical axis correspond to the positions of focal points in the focal point groups, and the corresponding relationship between the distances and positions of focal points is continuous and transits evenly. The inner and outer ends of the focal point groups are defined with respect to 101, i.e., the inner end is close to 101 and the outer end is far away from 101.

Figure 5:
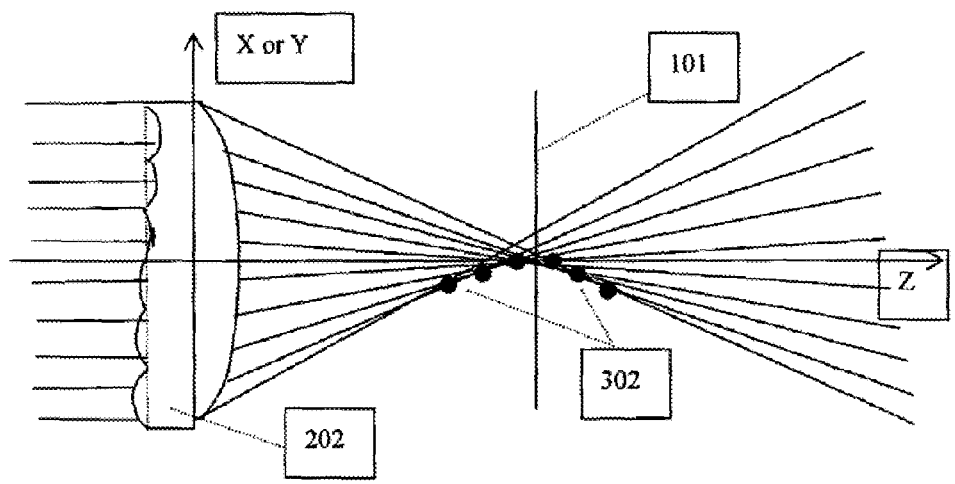
FIG. 5 is a schematic sectional diagram of a curved surface structure with a "/\" shape along x or y axis, wherein the curved surface is a typical odd symmetrical discrete focal point curved surface.

In FIG. 5, 202 represents a combination of the focusing imaging platform system and a discrete multi-focus blurred mask. FIG. 5 shows a section plan along x axis or y axis, wherein 101 represents the schematic position of the image plane; 302 represents the structure of discrete focal point groups. The structure is characterized in that the focal point groups represent a "/\". shaped structure distributed on one side of the optical axis and two sides of the image plane. Since the mask with odd symmetry characteristic is asymmetric with respect to the optical axis, the focal point groups can only be distributed on a single side of the optical axis. The focal point groups are separated by the image plane into an inner focal point group and an outer focal point group. The outer end of the inner focal point group corresponds to the far end of convex spherical surfaces that is most distant from the optical axis, and the inner end of the inner focal point group corresponds to the center of the curved surfaces; the inner end of the outer focal point group corresponds to the center of the curved surfaces, and the outer end of the outer focal point group corresponds to the far end of concave spherical surfaces that is most distant from the optical axis. Wherein, the corresponding relationship between the curvatures of points on the convex or concave surfaces and the distances from the points to the optical axis is continuous and monotonous. The form of continuous focal points deduced from this structure is the form of focal points in the conventional technology of CDM Optics.

Figure 6:
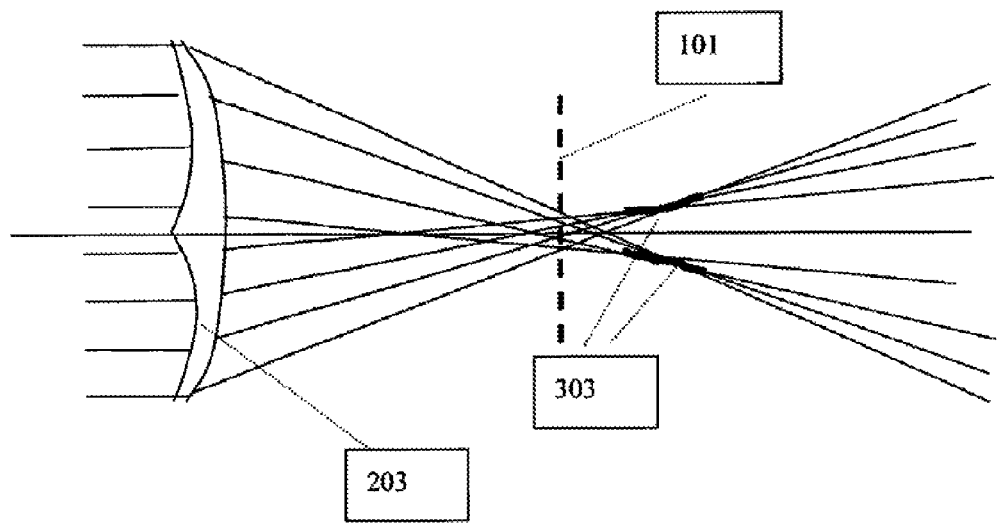
FIG. 6 is a diagram of a focal point group structure of "/\" shape with a 90° anticlockwise rotation.

In FIG. 6, 203 represents a combination of the focusing imaging platform system and a continuous multi-focus blurring mask. FIG. 6 shows a section plan along X axis or Y axis, wherein 101 represents the schematic position of the image plane, 303 represents the structure of continuous focal point groups, which is characterized in that the focal point groups is shaped as a 90° anticlockwise rotated character "/\". Since the curved surface of the mask is mainly concave curved surface, the focal point groups thereof only comprise the outer focal point group which can only be distributed on two sides of the optical axis and the outer side of the image plane.

Figure 7:
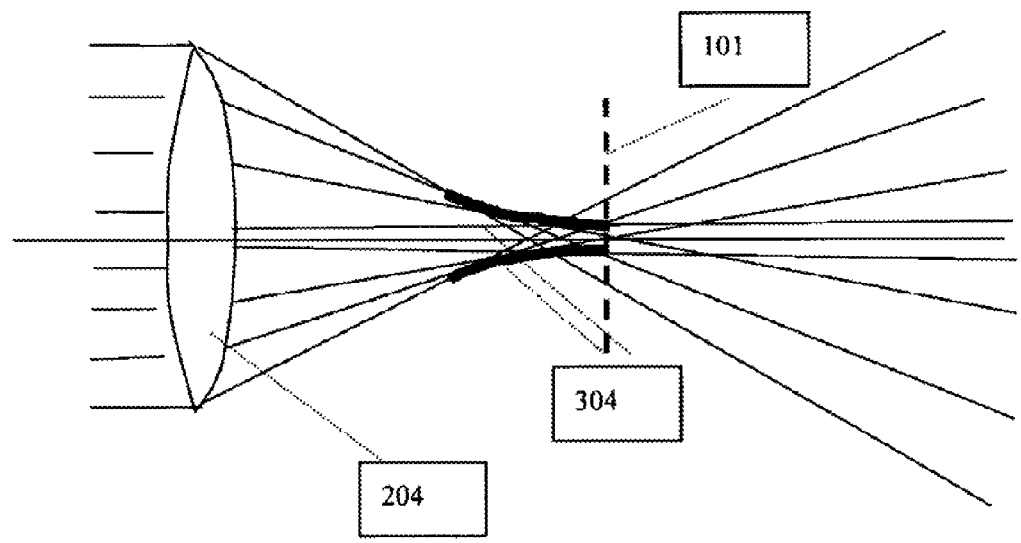
FIG. 7 is a diagram of a focal point group structure of "/\" shape with a 90° clockwise rotation.
Figure 8:
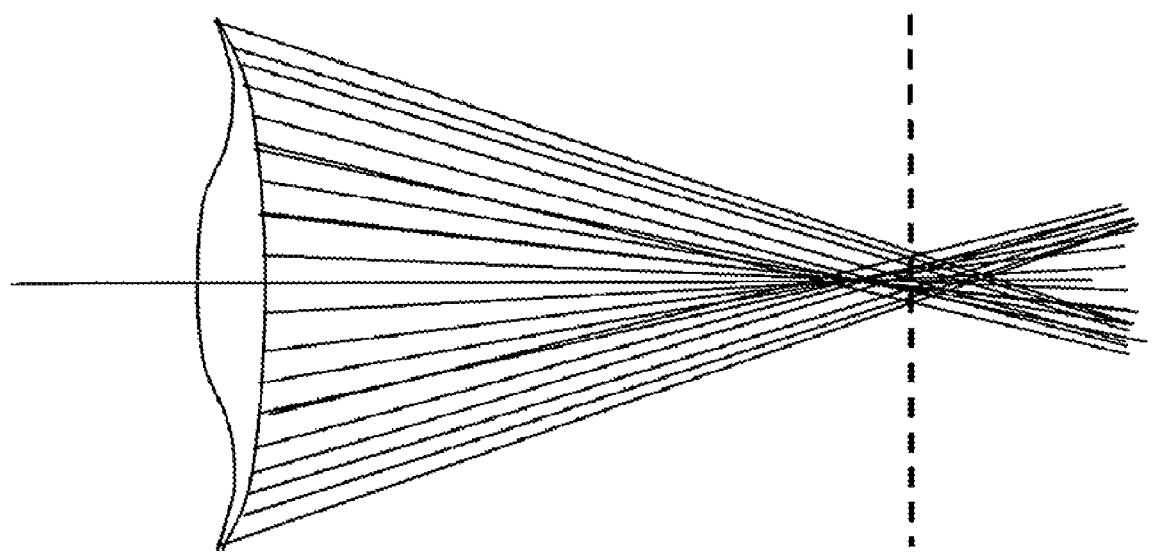
FIG. 8 is a diagram schematically showing the optical focusing of a combined system with inner continuous multi-focus and outer discrete multi-focus.
Figure 9:
FIG. 9 is a diagram showing the outer profile of a lens of a discrete multi-focus focusing compensation system according to an embodiment of the present invention.
Figure 10:
FIG. 10 is a diagram showing the outer profile of a lens of a continuous multi-focus focusing compensation system according to an embodiment of the present invention.
Figure 11:
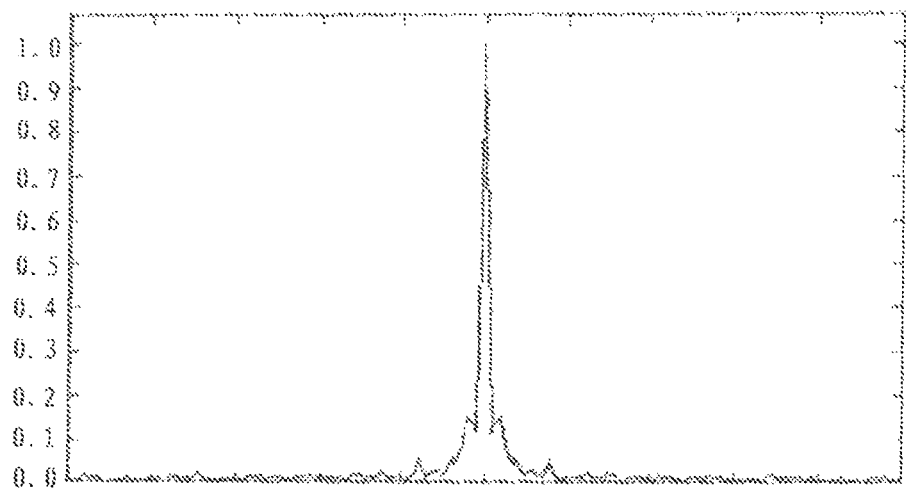
FIG. 11 is a typical psf sectional diagram of a surface shape constructed by rotating an even function in the case of a round aperture stop.
Figure 12:
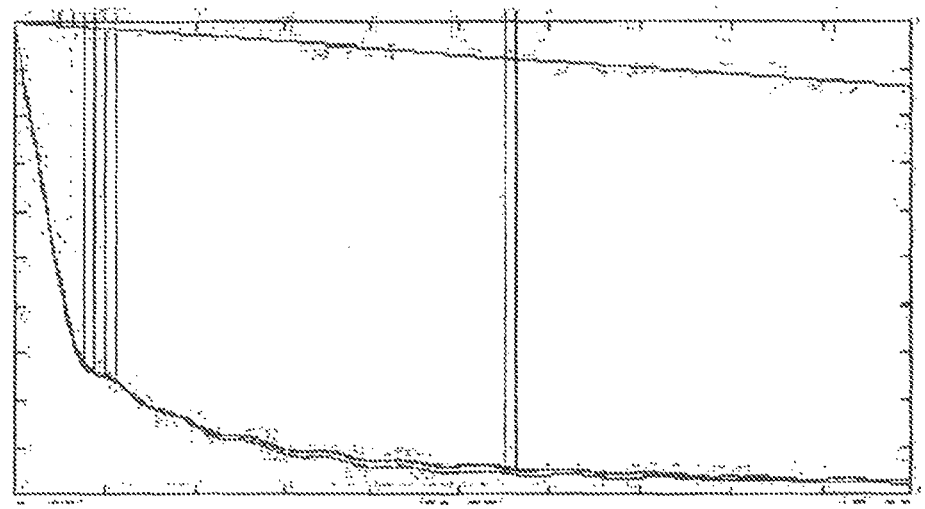
FIG. 12 is a typical mtf diagram of a surface shape constructed by rotating an even function in the case of a round aperture stop.

In FIG. 7, 204 represents a combination of the focusing imaging platform system and a continuous multi-focus blurring mask. FIG. 7 shows a section plan along X axis or Y axis, wherein 101 represents the schematic position of the image plane, 304 represents the structure of continuous focal point groups, which is characterized in that the focal point groups is shaped as a 90° clockwise rotated character "/\".

The classification for continuous characteristic of focal point track of the multi-focus lens and the method for forming the surface shape of the multi-focus lens are described below.

In FIGS. 4, 6 and 7, phase masks with the curved surface shape constructed based on even function curved lines, which are centrosymmetric with respect to the optical axis or axisymmetric with respect to the xoz, yoz planes, are combined with the focusing imaging platform system to realize the function of the multi-focus lens. The multi-focus lens can be further classified into three types according to the focal point type. Likewise, its corresponding surface shapes are also accordingly classified into three types. One type is a continuous multi-focus surface shape, as shown in FIGS. 4, 6 and 7. Another type is a discrete multi-focus surface shape. As shown in FIG. 5, this type of surface shape is formed by sampling curvatures of a continuous multi-focus surface shape and then using circular arc surfaces each having a single same curvature as one of the sampled curvatures to replace the original continuous surface shape in the sampled positions and ranges. Thus, corresponding converged points of rays in the image space are changed to be a discrete focal point track from a continuous focal point track. From the perspective of the light spots appeared on the image plane, the psf generated by appropriately sampling some segments of the continuous multi-focus surface is also very approximate to that of the continuous multi-focus surface shape, thus it is fully practicable. The third type is a continuous and discrete combined multi-focus surface shape. This type of surface shape is characterized in that it is formed by appropriately dividing an original continuous surface shape into segments, and retaining the continuous multi-focus surface shape in some segments while replacing the continuous multi-focus surface shape with a discrete multi-focus surface shape in other segments, as such, the resultant psf is also very approximate to that of the fully continuous multi-focus surface shape, thus it is fully practicable.

The system shown in FIG. 5 is a two-dimensional section of an odd symmetrical curved surface with discrete focal points. Methods for forming the odd symmetrical curved surface with discrete focal points are as follows. In the first case, the odd symmetrical curved surface with discrete focal points is a curved surface $$z(r, \varphi) = k(\varphi) f\left(\frac{r}{l(\varphi)}\right)[u(\varphi + \pi) - u(\varphi)],$$

which is constructed by rotating a curved line of discrete curvatures or a compound line of discrete and continuous curvatures $z(r)=f(r)sgn(r)$, which is odd symmetric with respect to the z axis, by 180°, wherein, $sgn(r)$ is a sign function, $u(\varphi)$ is a step function, $0 \prec \varphi \leq \pi$, $k(\varphi)$, $l(\varphi)$ are scaling coefficient functions with $\varphi$ as variables. In the second case, the odd symmetrical curved surface with discrete focal points is an odd symmetrical curved surface $$z_{ty}(x, y) = k(y) f\left(\frac{x}{l(y)}\right) m(x) g\left(\frac{y}{n(x)}\right),$$

which is constructed on the basis of curved line of discrete curvatures or a compound line of discrete and continuous curvatures $z(x)=f(x)=-f(-x)$ and $z(y)=g(y)=-g(-y)$, which is odd symmetric within the xoz and yoz planes respectively, wherein, $k(y)$, $l(y)$, $m(x)$, $n(x)$ are scaling coefficient functions with y, x as variables.

As to the three types of three-dimensional surface shapes based on even function curved lines, each of them is formed by two ways. The first way is to form an axisymmetric curved surface. Particularly, the axisymmetric curved surface is formed by multiplying two curved line equations which have single-variable within the xoz and yoz planes respectively to obtain a three-dimensional curved surface equation with double variables, wherein in the process of multiplying, a certain symmetrically scaling in amplitudes/dimensions may be firstly made for the original two-dimensional curved lines and then multiplication is performed to obtain the symmetrical three-dimensional curved surface based on the original curved lines. The second way is to form a three-dimensional centrosymmetric curved surface by regularly rotating a symmetrical curved line by 180° with respect to the central point of the curved line. The regularly rotation refers to that a certain centrosymmetrically scaling in amplitudes/dimensions may be made along the directions of the two variants of the polar coordinate system to form a centrosymmetric three-dimensional curved surface.

In the first way as mentioned above, the method for forming the curved surface is performed by multiplying two univariate curved line equations $z(x)=f(x)$ and $z(y)=g(y)$ within the xoz and yoz planes to obtain a bivariate equation of a three-dimensional curved surface, wherein, in the process of multiplication, a certain symmetrically scaling in amplitudes/dimensions may be made for the original two-dimensional curved lines to obtain a symmetrical three-dimensional curved surface $$z_{ty}(x, y) = k(y) f\left(\frac{x}{l(y)}\right) m(x) g\left(\frac{y}{n(x)}\right)$$

based on the original curved lines, wherein $k(y)$, $l(y)$, $m(x)$, $n(x)$ are amplitude/dimension scaling even functions with y and x as variables. In the second way, by rotating a symmetrical curved line $z(r,\phi_0)=f(r,\phi_0)+f(r,\phi_0+\pi)$ with respect to its central point by 180° and at the same time making the symmetrical curved line $z(r,\phi_0)=f(r,\phi_0)+f(r,\phi_0+\pi)$ scaled according to a certain amplitude/dimension scaling function, a centrosymmetrical three-dimensional curved surface $$z_{ty}(r, \varphi) = k(\varphi) f\left(\frac{r}{l(\varphi)}\right) + k(\varphi + \pi) f\left(\frac{r}{l(\varphi + \pi)}, \varphi + \pi\right)$$

is formed, wherein, $k(\phi)=k(\phi=\pi)$, $l(\phi)=l(\phi+\pi)$ are continuous amplitude/dimension scaling functions with an angle variable $\phi$ and a period of $\pi$, $0 \leq \phi < \pi$, and $\phi_0$ is an angle constant.

The selection of the parameter functions $k(y)$, $l(y)$, $m(x)$, $n(x)$, $k(\phi)$, $l(\phi)$ depends on focusing ability, DOF of equally blurred image and the controlled degree of light spot size of the system.

The curved surface formed by the above two ways is effective within the light admitting range of the aperture stop.

As to the centrosymmetric curved surface formed by an even symmetric curved line, since its curved surface has only one independent variable r, that is, polar radius, which is identical to the independent variable of a spherical surface, the surface shape may not only be independently designed as a surface shape of the phase mask, but may also be designed and assembled together with the spherical surface of a focusing platform system, thus the difficulty and cost of assembly are considerably reduced, and it is very practicable.

A discrete multi-focus curved line refers to a curved line in which each of the segments constituting the curved line has a fixed and unique curvature, and the curvatures of the adjacent segments may be identical or different and may be negative or positive. The curvature of the surface shape constructed by one segment is combined with the curvature of the focusing platform system to constitute one focal point of the multi-focus lens, and the surface shapes formed by a plurality of segments are combined with the focusing platform system to constitute a discrete multi-focus structure, and thus the multi-focus lens with such a focal point structure realizes the function of full mutual compensation among rays.

A continuous multi-focus curved line segment refers to a curved line segment having continuous curvatures. The surface shape constructed by this type of curved line segment is combined with the focusing platform system to form a continuous focal point track, and thereby to form a focal point structure. The focal point structure is shown in FIGS. 4, 6 and 7.

The surface shape constructed by a combined curved line of discrete multi-focus curved line segments and continuous multi-focus curved line segments is combined with the focusing platform system to form a continuous and discrete mixed focal point structure.

According to the aforementioned principles and construction ways, the continuous multi-focus surface shape, the discrete multi-focus surface shape and the discrete and continuous combined multi-focus surface shape constructed on the basis of the even symmetric function curved line are all within the scope of protection of the present invention. The discrete multi-focus surface shape and the discrete and continuous combined multi-focus surface shape constructed on the basis of the non-even symmetric multi-focus surface shape are both within the scope of protection of the present invention. The equations of surface shapes of some typical continuous multi-focus curved surfaces will be exemplified below. These equations are all constructed on the basis of cosine functions. However, the present invention is not limited to these functions. Other construction ways, such as expanding the Taylor polynomial function of the cosine function or using some other functions or a combination of other functions to fit curved lines identical to the curved surfaces represented by the following equations, do not affect the creative ideas of the present invention and all belong to the scope of protection of the present invention.

A. Even symmetric multi-focus optical focusing curved surfaces or their equivalent curved surfaces, characterized in that they are expressed by the following mathematic functions.

(a) A circularly even symmetric curved surface in the polar coordinate system, $$z(r, \varphi) = \frac{c \cdot r^2}{1 + \sqrt{1 - c^2 \cdot r^2}} + z_{ty}(r, \varphi)$$

$$z_{ty}(r, \varphi) = \sum_{i=1}^{n} \left\{ \left[ z_{rgi}(\varphi) \cdot \left[ \cos\left( \begin{array}{c} pd_i(\varphi) \cdot \frac{r - r_{i-1}}{r_{rgi}} \cdot \\ 2\pi - ph_i \cdot 2\pi \\ \cos(ph_i \cdot 2\pi) \end{array} \right) - \right] + z_{ty}(r_{i-1}, \varphi) \right] \cdot \right\}$$
$$[u(r - r_{i-1}) - u(r - r_i)]$$

wherein, $z(r,\phi)$ is an axial vector height of the curved surface at $(r,\phi)$, $z_{rgi}$ is an axial amplitude of an ith cosine curved line segment, $r_{rgi}$ is a radial length of the ith cosine curved line segment, $r_i$ is a radius of the outer end point of the ith cosine curved line segment, $r_0$ equals to zero, r is a variable of axial length of the curved surface and $0 \leq r \leq r_m$, $r_m$ is the radius of the aperture stop, $\phi$ is an angle variable of polar coordinates of the curved surface, $pd_i$ is a periodic coefficient of the ith curved surface segment, $ph_i$ is an initial phase coefficient of the ith curved surface segment, c is the curvature of basic spherical surface, $u(r-r_i)$ is a radial step function with $r_i$ as a starting point, n is the number of the radically divided segments of the cosine curved line, i is the sequence number of the ith segment.

(b) A centrally even symmetric curved surface $$z(r, \varphi) = \frac{c \cdot r^2}{1 + \sqrt{1 - c^2 \cdot r^2}} + z_{ty}(r, \varphi)$$

$$z_{ty}(r, \varphi) = \sum_{i=1}^{n} \left\{ \left[ z_{rgi}(\varphi) \cdot \left[ \cos\left( \begin{array}{c} pd_i(\varphi) \cdot \frac{r - r_{i-1}(\varphi)}{r_{rgi}(\varphi)} \cdot \\ 2\pi - ph_i(\varphi) \cdot 2\pi \\ \cos(ph_i(\varphi) \cdot 2\pi) \end{array} \right) - \right] + z_{ty}(r_{i-1}, \varphi) \right] \cdot \right\}$$
$$\{u[r(\varphi) - r_{i-1}(\varphi)] - u[r(\varphi) - r_i(\varphi)]\}$$

wherein, each of functions $z_{rgi}(\phi)$, $pd_i(\phi)$, $r_{i-1}(\phi)$, $r_{rgi}(\phi)$, $ph_i(\phi)$, $r_i(\phi)$ is a continuous function of $\phi$, $0 \leq \phi \prec 2\pi$.

Wherein, $z(r,\phi)$ is a vector height along z axis of the curved surface at $(r,\phi)$, $\phi$ is an angle variable of the curved surface in the polar coordinate system, r is a radial length variable of the curved surface and $0 \leq r \leq r_m$, $r_m$ is the radius of the aperture stop, $z_{rgi}(\phi)$ is an axial amplitude of the ith cosine curved line segment at $\phi$, $r_{rgi}(\phi)$ is a radial length of the ith cosine curved line segment at $\phi$, $r_i(\phi)$ is a radius of the outer end point of the ith cosine curved line segment at $\phi$, $r_0(\phi)$ equals to zero, $pd_i(\phi)$ is a periodic coefficient of the ith curved surface at $\phi$, $ph_i(\phi)$ is an initial phase coefficient of the ith curved surface at $\phi$, c is the curvature of basic spherical surface, $u(r-r_i(\phi))$ is a radial step function with a starting point $(r_i(\phi), \phi)$, n is the number of the radically divided segments of the cosine curved line, i is the sequence number of the segment.

(c) An axially even symmetric curved surface, in the orthogonal coordinate system $$z(x, y) = \frac{c \cdot (x^2 + y^2)}{1 + \sqrt{1 - c^2 \cdot (x^2 + y^2)}} + z_{ty}(x, y)$$

$$z_{ty}(x, y) = z_{ty}(x_{i-1}, y_{j-1}) +$$

$$\sum_{i=1}^{m} \left\{ \left[ z_{rgi}(y) \cdot \left[ \cos\left( \begin{array}{c} pd_i(y) \cdot \frac{|x| - |x_{i-1}(y)|\text{sgn}(x)}{x_{rgi}(y)} \cdot \\ 2\pi - ph(y)_i \cdot 2\pi \\ \cos(ph_i(y) \cdot 2\pi) \end{array} \right) - \right] \cdot \right\} + \right.$$
$$[u(|x| - |x_{i-1}(y)|\text{sgn}(x)) - u(|x| - |x_i(y)|\text{sgn}(x))]$$

$$\sum_{j=1}^{n} \left\{ \left[ z_{rgi}(x) \cdot \left[ \cos\left( \begin{array}{c} pd_j(x) \cdot \frac{|y| - |y_{j-1}(x)|\text{sgn}(y)}{y_{rgi}(x)} \cdot \\ 2\pi - ph_j(x) \cdot 2\pi \\ \cos(ph_j(x) \cdot 2\pi) \end{array} \right) - \right] \cdot \right\} \right.$$
$$[u(|y| - |y_{j-1}(x)|\text{sgn}(y)) - u(|y| - |y_j(x)|\text{sgn}(y))]$$

wherein, $z(x, y)$ is a z axial vector height of the curved surface at $(x, y)$, x and y are coordinate points within the aperture stop, and $$x_{-max}(y) \leq x(y) \leq x_{+max}(y), y_{-max}(x) \leq |y(x)| \leq y_{+max}(x)$$

$x_{-max}(y)$, $x_{+max}(y)$, $y_{-max}(x)$, $y_{+max}(x)$ are outer boundary functions of the aperture stop, $z_{rgi}(y)$ is an x axial amplitude of the ith cosine curved line segment at y, $x_{rgi}(y)$ is a length of the ith cosine curved line segment at y, $x|x_i(y)|$ is the absolute value of the outer end point of the ith cosine curved line segment at y, $pd_i(y)$ is an x axial periodic coefficient of the ith curved surface segment at y, $ph_i(y)$ is an x axial initial phase coefficient of the ith curved surface segment at y, c is the curvature of the basic spherical surface, $u(|x|-|x_i(y)|sgn(x))$ is a combination of two step functions which are $u(x-x_i(y))$ while $x_i(y)>0$, and $u(x+x_i(y))$ while $x_i(y)<0$, m is the number of the divided segments of the curved surface along the positive direction of x axis, i is the sequence number of the ith segment, sgn(x) is a sign function.

In y axis direction, $z_{rgi}(x)$ is an axial amplitude of the jth cosine curved line segment at x, $y_{rgi}(x)$ is a length of the jth cosine curved line segment at x, $|y_j(x)|$ is the absolute value of the y coordinate of the outer end point of the jth cosine curved line segment at x, $pd_j(x)$ is a periodic coefficient of the jth curved surface segment at x, $ph_j(x)$ is an initial phase coefficient of the jth curved surface segment at x, $u(|y|-|y_j(x)|sgn(y))$ is a combination of two step functions which are $u(y-y_j(x))$ while $y_j(x)>0$, and $u(y+y_j(x))$ while $y_j(x)<0$, n is the number of the divided segments of the curved surface along the positive direction of y axis, j is the sequence number of the segment, sgn(y) is a sign function.

The above a mentioned curved surface equations are all even symmetrical curved surface constructed on the basis of a curved line which is even symmetrical with respect to the optical axis.

B. An odd symmetric optical focusing curved surface with multi-focus point group or its equivalent curved surface, characterizes in that it is expressed by the following mathematic functions.

An asymmetric focusing curved surface and its equivalent curved surface satisfy characteristics of the curved surface constructed by an odd function, and the specific characteristics are expressed by the following mathematic functions.

(a) A centrally symmetric odd function curved surface, in the polar coordinate system $$z(r, \varphi) = \frac{c \cdot r^2}{1 + \sqrt{1 - c^2 \cdot r^2}} + z_{ty}(r, \varphi)$$

$$z_{ty}(r, \varphi) = \sum_{i=1}^{n} \left\{ \left[ z_{rgi}(\varphi) \cdot \left[ \cos\left( \begin{array}{c} pd_i(\varphi) \cdot \frac{r - r_{i-1}(\varphi)}{r_{rgi}(\varphi)} \cdot \\ 2\pi - ph_i(\varphi) \cdot 2\pi \\ \cos(ph_i(\varphi) \cdot 2\pi) \end{array} \right) - \right] + z_{ty}(r_{i-1}, \varphi) \right] \cdot [sgn(\varphi - \pi - \theta_1)][u(r - r_{i-1}(\varphi)) - u(r - r_i(\varphi))] \right\}$$

$$\theta_i \le \varphi < (2\pi + \theta_i)$$

wherein, $z(r, \phi)$ is an axial vector height of the curved surface at $(r, \phi)$, $\phi$ is an angle variable of polar coordinate system of the curved surface, r is a radial length variable of the curved surface and $0 \le r \le r_m(\phi)$, $r_m(\phi)$ is the outline function of the aperture stop, $z_{rgi}(\phi)$ is an axial amplitude of the ith cosine curved line segment at $\phi$, $r_{rgi}(\phi)$ is a radial length of the ith cosine curved line segment at $\phi$, $r_i(\phi)$ is a radius of the outer end point of the ith cosine curved line segment at $\phi$, $r_0(\phi)$ equals to zero, $pd_i(\phi)$ is a periodic coefficient of the ith curved surface at $\phi$, $ph_i(\phi)$ is an initial phase coefficient of the ith curved surface at $\phi$, c is the curvature of the basic spherical surface, $u(r-r_i(\phi))$ is a radial step function at r with $(r_i, \phi)$ as a starting point, $sgn(\phi-\pi-\theta_i)$ is a sign function which equals to +1 when $\theta_i \le \theta < \theta_i+\pi$ and equals to −1 when $\theta_i+\pi \le \theta < \theta_i+2\pi$, n is the number of the radically divided segments of the cosine curved line, i is the sequence number of the segment.

(b) An orthogonal axially odd symmetric curved surface, in the orthogonal coordinate system $$z(x, y) = \frac{c \cdot (x^2 + y^2)}{1 + \sqrt{1 - c^2 \cdot (x^2 + y^2)}} + z_{ty}(x, y)$$

$$z_{ty}(x, y) = z_{ty}(x_{i-1}, y_{j-1}) +$$

$$\sum_{i=1}^{m} \left\{ \left[ z_{rgi}(y) \cdot \left[ \cos\left( \begin{array}{c} pd_i(y) \cdot \frac{|x| - |x_{i-1}(y)|sgn(x)}{x_{rgi}(y)} \cdot \\ 2\pi - ph_i(y) \cdot 2\pi \\ \cos(ph_i(y) \cdot 2\pi) \end{array} \right) - \right] \right. \right.$$
$$\left. \left. [sgn(x)][u(|x| - |x_{i-1}(y)|sgn(x)) - u(|x| - |x_i(y)|sgn(x))] \right\} +$$

$$\sum_{j=1}^{n} \left\{ \left[ z_{rgi}(x) \cdot \left[ \cos\left( \begin{array}{c} pd_j(x) \cdot \frac{|y| - |y_{j-1}(x)|sgn(y)}{y_{rgi}(x)} \cdot \\ 2\pi - ph_j(x) \cdot 2\pi \\ \cos(ph_j(x) \cdot 2\pi) \end{array} \right) - \right] \right. \right.$$
$$\left. \left. [sgn(y)][u(|y| - |y_{j-1}(y)|sgn(y)) - u(|y| - |y_j(y)|sgn(y))] \right\}$$

wherein, $z(x, y)$ is a z axial vector height of the curved surface at $(x, y)$, x and y are coordinate points within the aperture stop, and $$x_{-max}(y) \le x(y) \le x_{+max}(y), y_{-max}(x) \le |y(x)| \le y_{+max}(x)$$

$x_{-max}(y)$, $x_{+max}(y)$, $y_{-max}(x)$, $y_{+max}(x)$ are outer boundary functions of the aperture stop, $z_{rgi}(y)$ is an x axial amplitude of the ith cosine curved line segment at y, $x_{rgi}(y)$ is a length of the ith cosine curved line segment at y, $|x_i(y)|$ is the absolute value of the x coordinate of the outer end point of the ith cosine curved line segment at y, $pd_i(y)$ is an x axial periodic coefficient of the ith curved surface segment at y, $ph_i(y)$ is an x axial initial phase coefficient of the ith curved surface segment at y, c is the curvature of the basic spherical surface, $u(|x|-|x_i(y)|sgn(x))$ is an x axial positive-negative two-way step function with $|x_i(y)|sgn(x)$ as a starting point, m is the number of the divided segments of the curved surface along the positive direction of x axis, i is the sequence number of the segment.

In y axis direction, $z_{rgi}(x)$ is an axial amplitude of the jth cosine curved line segment at x, $y_{rgi}(x)$ is a length of the jth cosine curved line segment at x, $|y_j(x)|$ is the absolute value of the y coordinate of the outer end point of the jth cosine curved line segment at x, $pd_j(x)$ is a periodic coefficient of the jth curved surface segment at x, $ph_j(x)$ is an initial phase coefficient of the jth curved surface segment at x, $u(|y|-|y_j(x)|sgn(y))$ is a y axial positive-negative two-way step function with $|y_i(x)|sgn(y)$ as a starting point, n is the number of the divided segments of the cosine curved line along the positive direction of y axis, j is the sequence number of the segment.

C. An odd and even symmetric focusing curved surface with multi-focus point groups or its equivalent curved surface, which is characterized in that it is expressed by the following mathematic functions.

(a) An axially odd symmetric and even symmetric curved surface, in the orthogonal coordinate system $$z(x, y) = \frac{c \cdot (x^2 + y^2)}{1 + \sqrt{1 - c^2 \cdot (x^2 + y^2)}} + z_{ty}(x, y)$$

$$z_{ty}(x, y) = z_{ty}(x_{i-1}, y_{j-1}) +$$

-continued $$\sum_{i=1}^{m} \left\{ z_{rgi}(y) \cdot \left[ \cos\left( \begin{array}{c} pd_i(y) \cdot \dfrac{|x|-|x_{i-1}(y)|\mathrm{sgn}(x)}{x_{rgi}(y)} \cdot \\ 2\pi - ph_i(y) \cdot 2\pi \\ \cos(ph_i(y) \cdot 2\pi) \end{array} \right) - \right] \right\} + $$
$$[u(|x|-|x_{i-1}(y)|\mathrm{sgn}(x)) - u(|x|-|x_i(y)|\mathrm{sgn}(x))]$$

$$\sum_{j=1}^{n} \left\{ z_{rgi}(x) \cdot \left[ \cos\left( \begin{array}{c} pd_j(x) \cdot \dfrac{|y|-|y_{j-1}(x)|\mathrm{sgn}(y)}{y_{rgi}(x)} \cdot \\ 2\pi - ph_j(x) \cdot 2\pi \\ \cos(ph_j(x) \cdot 2\pi) \end{array} \right) - \right] \right\}$$
$$[\mathrm{sgn}(y)][u(|y|-|y_{j-1}(y)|\mathrm{sgn}(y)) - u(|y|-|y_j(y)|\mathrm{sgn}(y))]$$

or $$z(x, y) = \frac{c \cdot (x^2 + y^2)}{1 + \sqrt{1 - c^2 \cdot (x^2 + y^2)}} + z_{ty}(x, y)$$

$$z_{ty}(x, y) = z_{ty}(x_{i-1}, y_{j-1}) + $$

$$\sum_{i=1}^{m} \left\{ z_{rgi}(y) \cdot \left[ \cos\left( \begin{array}{c} pd_i(y) \cdot \dfrac{|x|-|x_{i-1}(y)|\mathrm{sgn}(x)}{x_{rgi}(y)} \cdot \\ 2\pi - ph_i(y) \cdot 2\pi \\ \cos(ph_i(y) \cdot 2\pi) \end{array} \right) - \right] \right\} + $$
$$[\mathrm{sgn}(x)][u(|x|-|x_{i-1}(y)|\mathrm{sgn}(x)) - u(|x|-|x_i(y)|\mathrm{sgn}(x))]$$

$$\sum_{j=1}^{n} \left\{ z_{rgi}(x) \cdot \left[ \cos\left( \begin{array}{c} pd_j(x) \cdot \dfrac{|y|-|y_{j-1}(x)|\mathrm{sgn}(y)}{y_{rgi}(x)} \cdot \\ 2\pi - ph_j(x) \cdot 2\pi \\ \cos(ph_j(x) \cdot 2\pi) \end{array} \right) - \right] \right\}$$
$$[u(|y|-|y_{j-1}(y)|\mathrm{sgn}(y)) - u(|y|-|y_j(y)|\mathrm{sgn}(y))]$$

wherein, $z(x, y)$ is a z axial vector height of the curved surface at $(x, y)$, x and y are coordinate points within the aperture stop, and $$x_{-max}(y) \leq x(y) \leq x_{+max}(y), y_{-max}(x) \leq |y(x)| \leq y_{+max}(x)$$

$x_{-max}(y)$, $x_{+max}(y)$, $y_{-max}(x)$, $y_{+max}(x)$ are outer boundary functions of the aperture stop respectively, $z_{rgi}(y)$ is an x axial amplitude of the ith cosine curved line segment at y, $x_{rgi}(y)$ is a length of the ith cosine curved line segment at y, $|x_i(y)|$ is the absolute value of the x coordinate of the outer end point of the ith cosine curved line segment at y, $pd_i(y)$ is an x axial periodic coefficient of the ith curved surface segment at y, $ph_i(y)$ is an x axial initial phase coefficient of the ith curved surface segment at y, c is the curvature of the basic spherical surface, $u(|x|-|x_i(y)|\mathrm{sgn}(x))$ is an x axial positive-negative two-way step function with $|x_i(y)|\mathrm{sgn}(x)$ as a starting point, m is the number of the divided segments of the curved surface along the positive direction of x axis, i is the sequence number of the segment.

In y axis direction, $z_{rgi}(x)$ is an axial amplitude of the jth cosine curved line segment at x, $y_{rgi}(x)$ is a length of the jth cosine curved line segment at x, $|y_j(x)|$ is the absolute value of the y coordinate of the outer end point of the jth cosine curved line segment at x, $pd_j(x)$ is a periodic coefficient of the jth curved surface segment at x, $ph_j(x)$ is an initial phase coefficient of the jth curved surface segment at x, $u(|y|-|y_j(x)|\mathrm{sgn}(y))$ is a y axial positive-negative two-way step function with $|y_j(x)|\mathrm{sgn}(y)$ as a starting point, n is the number of the divided segments of the cosine curved line along the positive direction of y axis, j is the sequence number of the segment.

(b) A centrally odd symmetric and centrally even symmetric combined curved surface, uniformly divided into sections according to an angle, in the polar coordinate system $$z(r, \varphi) = \frac{c \cdot r^2}{1 + \sqrt{1 - c^2 \cdot r^2}} + z_{ty}(r, \varphi)$$

$$z_{ty}(r, \varphi) = $$

$$\sum_{k=1}^{p} \sum_{i=1}^{m} \left\{ \left[ z_{orgi}(\varphi) \cdot \left[ \cos\left( \begin{array}{c} pd_{oi}(\varphi) \cdot \dfrac{r - r_{o(i-1)}(\varphi)}{r_{orgi}(\varphi)} \cdot \\ 2\pi - ph_{oi}(\varphi) \cdot 2\pi \\ \cos(ph_{oi}(\varphi) \cdot 2\pi) \end{array} \right) - \right] \right. \right. \\ \left. \left. z_{oty}(r_{i-1}, \varphi) \right] \cdot \\ [\mathrm{sgn}(\varphi - \pi - \theta_{i(k-1)})] \cdot \\ [u(r - r_{o(i-1)}(\varphi)) - u(r - r_{oi}(\varphi))] \\ \left\{ \begin{array}{c} [u(\varphi - \theta_{k-1}) - u(\varphi - \theta_k)] + \\ [u(\varphi - \pi - \theta_{k-1}) - u(\varphi - \pi - \theta_k)] \end{array} \right\} \right\} + $$

$$\sum_{l=1}^{q} \sum_{j=1}^{n} \left\{ \left[ z_{ergi}(\varphi) \cdot \left[ \cos\left( \begin{array}{c} pd_{ej}(\varphi) \cdot \dfrac{r - r_{e(j-1)}(\varphi)}{r_{ergi}(\varphi)} \cdot \\ 2\pi - ph_{ej}(\varphi) \cdot 2\pi \\ \cos(ph_{ej}(\varphi) \cdot 2\pi) \end{array} \right) - \right] \right. \right. \\ \left. \left. z_{oty}(r_{j-1}, \varphi) \right] \\ [u(r - r_{e(j-1)}(\varphi)) - u(r - r_{ej}(\varphi))] \\ \left\{ \begin{array}{c} [u(\varphi - \theta_{l-1}) - u(\varphi - \theta_l)] + \\ [u(\varphi - \pi - \theta_{l-1}) - u(\varphi - \pi - \theta_l)] \end{array} \right\} \right\}$$

wherein, $z(r, \varphi)$ is an axial vector height of the curved surface at $(r, \varphi)$; $\varphi$ is an angle variable of the curved surface in the polar coordinate system; r is a radial length variable of the curved surface and $0 \leq r \leq r_m(\varphi)$, $r_m(\varphi)$ is the end point curved line function of the aperture stop; $z_{orgi}(\varphi)$ and $z_{ergj}(\varphi)$ are an axial amplitude of the ith cosine curved line segment of the odd symmetric curved surface at $\varphi$ and an axial amplitude of the jth cosine curved line segment of the even symmetric curved surface at $\varphi$ respectively; $r_{orgi}(\varphi)$ and $r_{ergi}(\varphi)$ are a radial length of the ith cosine curved line segment of the odd symmetric curved surface at $\varphi$ and a radial length of the jth cosine curved line segment of the even symmetric curved surface at $\varphi$ respectively; $r_{oi}(\varphi)$ and $r_{ej}(\varphi)$ are a radius of the outer end point of the ith cosine curved line segment of the odd symmetric curved surface at $\varphi$ and a radial vector height of the outer end point of the jth cosine curved line segment of the even symmetric curved surface at $\varphi$ respectively; $r_0(\varphi)$ equals to zero; $pd_{oi}(\varphi)$ and $pd_{ej}(\varphi)$ are a periodic coefficient of the ith curved surface segment of the odd symmetric curved surface at $\varphi$ and a periodic coefficient of the jth curved surface segment of the even symmetric curved surface at $\varphi$ respectively; $ph_{oi}(\varphi)$ and $ph_{ej}(\varphi)$ are an initial phase coefficient of the ith curved surface segment of the odd symmetric curved surface at $\varphi$ and an initial phase coefficient of the jth curved surface segment of the even symmetric curved surface at $\varphi$ respectively; $\theta_k$ and $\theta_l$ are angle dividing points of the odd symmetric curved surface and the even symmetric curved surface which are divided into sections within the range of a semicircle; the odd symmetric curved surface and the even symmetric curved surface are divided into 2p+2q sections within the range of $2\pi$, wherein the number of sections of the even symmetric curved surface is 2q, and the number of sections of the odd symmetric curved surface is 2p, the ranking sequence of these sections may be an arbitrary combination; $[u(\varphi-\theta_{k-1})-u(\varphi-\theta_k)]$ is the angle interval of the kth section of the odd symmetric curved surface; $[u(\varphi-\pi-\theta_{k-1})-u(\varphi-\pi-\theta_k)]$ is the angle interval of a section of the odd symmetric curved surface, wherein this section is odd symmetrical with respect to the kth section of the odd symmetric curved surface; $[u(\phi-\theta_{l-1})-u(\phi-\theta_l)]$ is the angle interval of the lth section of the even symmetric curved surface; $[u(\phi-\pi-\theta_{l-1})-u(\phi-\pi-\theta_l)]$ is the angle interval of a section of the even symmetric curved surface, wherein this section is even symmetrical with respect to the lth section of the even symmetric curved surface; c is the curvature of the basic spherical surface; $u(r-r_i(\phi))$ is a radial step function at r with $(r_i, \phi)$ as a starting point; $sgn(\phi-\pi-\theta_{i(k-1)})$ is a sign function which equals to +1 when $\theta_i \leq \theta < \theta_i+\pi$ and equals to −1 when $\theta_i+\pi \leq \theta < \theta_i+2\pi$; m and n are numbers of the sections of the odd symmetric curved surface and even symmetric curved surface divided along the radius respectively; i and j are sequence numbers of the section of the odd symmetric curved surface and the section of the even symmetric curved surface divided along the radius.

(c) A centrally odd symmetric and centrally even symmetric combined curved surface, uniformly divided into sections along the radius, in the polar coordinate system $$z(r, \varphi) = \frac{c \cdot r^2}{1 + \sqrt{1 - c^2 \cdot r^2}} + z_{ty}(r, \varphi)$$

$$z_{ty}(r, \varphi) = \sum_{i=1}^{m} \left\{ \begin{bmatrix} \sum_{k=1}^{pi} \left\{ z_{orgi}(\varphi) \cdot \begin{bmatrix} \cos\left(pd_{oi}(\varphi) \cdot \frac{r - r_{o(i-1)}(\varphi)}{r_{orgi}(\varphi)} \cdot \right) - \\ 2\pi - ph_{oi}(\varphi) \cdot 2\pi \\ \cos(ph_{oi}(\varphi) \cdot 2\pi) \end{bmatrix} \cdot \\ [sgn(\varphi - \pi - \theta_{i(k-1)})] \cdot \\ \left\{ \begin{matrix} [u(\varphi - \theta_{k-1}) - u(\varphi - \theta_k)] + \\ [u(\varphi - \pi - \theta_{k-1}) - u(\varphi - \pi - \theta_k)] \end{matrix} \right\} \right\} + \\ \sum_{l=1}^{qi} \left\{ z_{ergi}(\varphi) \cdot \begin{bmatrix} \cos\left(pd_{ei}(\varphi) \cdot \frac{r - r_{e(i-1)}(\varphi)}{r_{ergi}(\varphi)} \cdot \right) - \\ 2\pi - ph_{ei}(\varphi) \cdot 2\pi \\ \cos(ph_{ei}(\varphi) \cdot 2\pi) \end{bmatrix} \cdot \\ \left\{ \begin{matrix} [u(\varphi - \theta_{l-1}) - u(\varphi - \theta_l)] + \\ [u(\varphi - \pi - \theta_{l-1}) - u(\varphi - \pi - \theta_l)] \end{matrix} \right\} \right\} \end{bmatrix} \cdot \\ [u(r - r_{e(i-1)}(\varphi)) - u(r - r_{ei}(\varphi))] + z_{ty}(r_{i-1}, \varphi) \right\}$$

wherein, $z(r, \phi)$ is an axial vector height of the curved surface at $(r, \phi)$, $\phi$ is an angle variable of the curved surface in the polar coordinate system, r is a radial length variable of the curved surface and $0 \leq r \leq r_m(\phi)$, $r_m(\phi)$ is the end point curved line function of the aperture stop, $z_{orgi}(\phi)$ and $z_{ergi}(\phi)$ are an axial amplitude of the ith cosine curved line segment of the odd symmetric curved surface at $\phi$ and an axial amplitude of the jth cosine curved line segment of the even symmetric curved surface at $\phi$ respectively, $r_{orgi}(\phi)$ and $r_{ergi}(\phi)$ are a radial length of the ith cosine curved line segment of the odd symmetric curved surface at $\phi$ and a radial length of the nth cosine curved line segment of the even symmetric curved surface at $\phi$ respectively, $r_{oi}(\phi)$ and $r_{ei}(\phi)$ are a radius of the outer end point of the ith cosine curved line segment of the odd symmetric curved surface at $\phi$ and a radial vector height of the outer end point of the ith cosine curved line segment of the even symmetric curved surface at $\phi$ respectively; $r_0(\phi)$ equals to zero; $pd_{oi}(\phi)$ and $pd_{ei}(\phi)$ are a periodic coefficient of the ith curved surface segment of the odd symmetric curved surface at $\phi$ and a periodic coefficient of the ith curved surface segment of the even symmetric curved surface at $\phi$ respectively; $ph_{oi}(\phi)$ and $ph_{ei}(\phi)$ are an initial phase coefficient of the ith curved surface segment of the odd symmetric curved surface at $\phi$ and an initial phase coefficient of the ith curved surface segment of the even symmetric curved surface at $\phi$ respectively; $\theta_k$ and $\theta_l$ are angle dividing points of the odd symmetric curved surface and the even symmetric curved surface which are divided into sections within the range of a semicircle; the odd symmetric curved surface and the even symmetric curved surface are divided into 2pi+2qi sections in the ith curved surface within the range of $2\pi$, wherein the number of sections of the even symmetric curved surface is 2qi, and the number of sections of the odd symmetric curved surface is 2pi, the ranking sequence of these sections may be an arbitrary combination; $[u(\phi-\theta_{k-1})-u(\phi-\theta_k)]$ is the angle interval of the kth section of the odd symmetric curved surface; $[u(\phi-\pi-\theta_{k-1})-u(\phi-\pi-\theta_k)]$ is the angle interval of a section of the odd symmetric curved surface, wherein the section is odd symmetrical with respect to the kth section of the odd symmetric curved surface; $[u(\phi-\theta_{l-1})-u(\phi-\theta_l)]$ is the angle interval of the lth section of the even symmetric curved surface; $[u(\phi-\pi-\theta_{l-1})-u(\phi-\pi-\theta_l)]$ is the angle interval of a section of the even symmetric curved surface, wherein this section is even symmetrical with respect to the lth section of the even symmetric curved surface; c is the curvature of the basic spherical surface; $u(r-r_i(\phi))$ is a radial step function at r with $(r_i, \phi)$ as a starting point; $sgn(\phi-\pi-\theta_{i(k-1)})$ is a sign function which equals to +1 when $\theta_{i(k-1)} \leq \theta < \theta_{i(k-1)}+\pi$ and equals to −1 when $\theta_{i(k-1)}+\pi \leq \theta < \theta_{i(k-1)}+2\pi$; m is the number of the radically divided sections of the odd symmetric curved surface; i is the sequence number of the section of the odd symmetric curved surface.

While the present invention has been described with reference to the preferred embodiments, it will be apparent to those skilled in the art that various changes and modifications may be made without departing from the technical principle of the present invention, and these changes and modifications are also construed to be within the scope of the invention.

What is claimed is:

1. A device for acquiring equally blurred intermediate images comprising a focusing imaging lens and a phase mask positioned at an aperture stop of the focusing imaging lens, characterized in that the device is able to produce an approximately equal point spread function (psf) output with a space-invariant characteristic in a designed range of depth-of-field; the device realizing the space-invariant transferring characteristic comprises a multi-focus focusing lens with ray compensation characteristic; angles of rays guided by the multi-focus lens change in response to object distances, whereas a corresponding position and energy distribution of a light spot on an image plane of the device remain substantially constant.

2. The device for acquiring equally blurred intermediate images of claim 1, wherein a curved surface of the phase mask is an even symmetric curved surface constructed on the basis of a curved line which is even symmetric with respect to an optical axis.

3. The device for acquiring equally blurred intermediate images of claim 2, wherein a focal point structure of the device can be described as a focal point track within any section along a chief ray, the focal point track within any section along the chief ray is characterized as a continuous track or a discrete track or a combination of continuous track and discrete track and is shaped to have a characteristic of a character "X" which has four focal point track segments divided by a central crossing point.

4. The device for acquiring equally blurred intermediate images of claim 2, wherein a focal point structure of the device can be described as a focal point track within any section along a chief ray, the focal point track within any section along the chief ray is characterized as a continuous track or a discrete track or a combination of continuous track and discrete track and is shaped to have a characteristic of a character "/\". rotated counterclockwise or clockwise by 90°.

5. The device for acquiring equally blurred intermediate images of claim 2, wherein a curved surface equation of the phase mask is described as a curved surface equation which is obtained, on the basis of two-dimensional curved lines, by multiplying two orthogonal two-dimensional curved line equations in an orthogonal coordinate system while appropriately scaling the two curved line equations in amplitudes/dimensions, and the curved surface represented by the curved surface equation within a definition domain of the aperture stop is the curved surface of the phase mask.

6. The device for acquiring equally blurred intermediate images of claim 5, wherein the two-dimensional curved lines are $z(x)=f(x)=f(-x)$, $z(y)=g(y)=g(-y)$, and the obtaining of the curved surface equation by multiplying two orthogonal curved line equations in the orthogonal coordinate system while appropriately scaling in amplitudes/dimensions comprises the following:

a curved surface equation $$z_{ty}(x, y) = k(y)f\left(\frac{x}{l(y)}\right)m(x)g\left(\frac{y}{n(x)}\right)$$

is obtained by multiplying two orthogonal curved line equations $z(x)=f(x)$, $z(y)=g(y)$ in the orthogonal coordinate system while appropriately scaling using amplitude/dimension scaling functions $k(y)$, $l(y)$, $m(x)$, $n(x)$ with corresponding variables y and x, where $k(y)$, $l(y)$, $m(x)$, $n(x)$ are amplitude/dimension scaling even functions with corresponding variables y and x.

7. The device for acquiring equally blurred intermediate images of claim 6, wherein the two-dimensional curved lines $z(x)=f(x)$, $z(y)=f(y)$ are even curved lines which are even symmetrical with respect to ZOY and ZOX planes, the phase mask with the curved surface defined by $$z_{ty}(x, y) = k(y)f\left(\frac{x}{l(y)}\right)m(x)g\left(\frac{y}{n(x)}\right)$$

can be designed together with the focusing imaging lens, and achieve the function of focusing and phase masking in form of an aspheric lens.

8. The device for acquiring equally blurred intermediate images of claim 6, wherein the two-dimensional curved line comprises a continuous curvature curved line, a discrete curvature curved line, or a combination of continuous curvature curved line segments and one or more discrete curvature curved line segments.

9. The device for acquiring equally blurred intermediate images of claim 8, wherein each of the discrete curvature curved line segments has a fixed and unique curvature.

10. The device for acquiring equally blurred intermediate images of claim 9, wherein the curvatures of neighboring segments among the discrete curvature curved line segments may be identical or different, and may be negative or positive.

11. The device for acquiring equally blurred intermediate images of claim 2, wherein the curved surface of the phase mask is an end-to-end connected and continuous curved surface which is obtained, on the basis of a two-dimensional curved line, by appropriately scaling the curved line in a polar coordinate system in amplitude/dimension at different angles while rotating by 180°, and a portion of the continuous curved surface within the definition domain of the aperture stop is the curved surface of the phase mask.

12. The device for acquiring equally blurred intermediate images of claim 11, wherein the two-dimensional curved line is $z(r,\phi_0)=f(r,\phi_0)+f(r,\phi_0+\pi)$, $\phi_0$ is an angle constant, the obtaining of the end-to-end connected and continuous curved surface by appropriately scaling the radial curved line in the polar coordinate system in amplitude/dimension at different angles while rotating by 180° comprises the following:

an end-to-end connected and continuous curved surface $$z_{ty}(r, \varphi) = k(\varphi)f\left(\frac{r}{l(\varphi)}, \varphi\right) + k(\varphi+\pi)f\left(\frac{r}{l(\varphi+\pi)}, \varphi+\pi\right)$$

is obtained by scaling the radical curved line $z(r,\phi_0)=f(r,\phi_0)+f(r,\phi_0+\pi)$ in the polar coordinate system using amplitude/dimension scaling functions with an angle variable $\phi$ while rotating said line by 180°, wherein $k(\phi)=k(\phi+\pi)$, $l(\phi)=l(\phi+\pi)$ are scaling functions with an angle variable $\phi$ and a period of $\pi$, and $0 \leq \phi < \pi$.

13. The device for acquiring equally blurred intermediate images of claim 12, wherein the two-dimensional curved line $z(r,\phi_0)=f(r,\phi_0)+f(r,\phi_0+\pi)$ is an axially even function curved line, $\phi_0$ is an angle constant, the phase mask with the curved surface defined by $$z_{ty}(r, \varphi) = k(\varphi)f\left(\frac{r}{l(\varphi)}, \varphi\right) + k(\varphi+\pi)f\left(\frac{r}{l(\varphi+\pi)}, \varphi+\pi\right)$$

can be designed together with the focusing imaging lens, and achieve the function of focusing and phase masking in form of an aspheric lens.

14. The device for acquiring equally blurred intermediate images of claim 12, wherein the two-dimensional curved line comprises a continuous curvature curved line, a discrete curvature curved line, or a combination of continuous curvature curved line segments and one or more discrete curvature curved line segments.

15. The device for acquiring equally blurred intermediate images of claim 14, wherein each of the discrete curvature curved line segments has a fixed and unique curvature.

16. The device for acquiring equally blurred intermediate images of claim 15, wherein the curvatures of neighboring segments among the discrete curvature curved line segments may be identical or different, and may be negative or positive.

17. The device for acquiring equally blurred intermediate images of claim 2, wherein in a polar coordinate system the surface is expressed by the following:

$$z(r, \varphi) = \frac{c \cdot r^2}{1 + \sqrt{1 - c^2 \cdot r^2}} + z_{ty}(r, \varphi)$$

$$z_{ty}(r, \varphi) = \sum_{i=1}^{n} \left\{ \left[ z_{rgi}(\varphi) \cdot \left[ \cos\left( \frac{pd_i(\varphi) \cdot \frac{r - r_{i-1}(\varphi)}{r_{rgi}(\varphi)} \cdot}{2\pi - ph_i(\varphi) \cdot 2\pi} \right) - \cos(ph_i(\varphi) \cdot 2\pi) \right] + z_{ty}(r_{i-1}, \varphi) \cdot \right] \{u[r(\varphi) - r_{i-1}(\varphi)] - u[r(\varphi) - r_i(\varphi)]\} \right\}$$

wherein each of functions $z_{rgi}(\phi)$, $pd_i(\phi)$, $r_{i-1}(\phi)$, $r_{rgi}(\phi)$, $ph_i(\phi)$, $r_i(\phi)$ is a continuous function of $\phi$, $0 \leq \phi < 2\pi$;

and wherein $z(r,\phi)$ is a vector height along z axis of the curved surface at $(r,\phi)$, $\phi$ is an angle variable of the curved surface, r is an axial length variable of the curved surface, and $0 \leq r \leq r_m$, $r_m$ is the radius of the aperture stop, $z_{rgi}(\phi)$ is an axial amplitude of the ith cosine curved line segment at $\phi$, $r_{rgi}(\phi)$ is a radial length of the ith cosine curved line segment at $\phi$, $r_i(\phi)$ is a radius of the outer edge of the ith cosine curved line segment at $\phi$, $r_0(\phi)$ equals to zero, $pd_i(\phi)$ is a periodic coefficient of the ith curved surface, $ph_i(\phi)$ is an initial phase coefficient of the ith curved surface, c is the curvature of the basic spherical surface, $u(r-r_i(\phi))$ is a radial step function with a starting point $(r_i(\phi), \phi)$, n is the number of the radically divided segments of the cosine curved line, i is the sequence number of the segment.

18. The device for acquiring equally blurred intermediate images of claim 17, wherein $pd_i(\phi)$ and $r_i(\phi)$ may both be constants.

19. The device for acquiring equally blurred intermediate images of claim 2, wherein in the orthogonal coordinate system the surface is expressed by the following:

$$z(t, y) = \frac{c \cdot (x^2 + y^2)}{1 + \sqrt{1 - c^2 \cdot (x^2 + y^2)}} + z_{ty}(x, y)$$

$$z_{ty}(x, y) = z_{ty}(x_{i-1}, y_{j-1}) + \sum_{i=1}^{m}\left\{z_{rgi}(y) \cdot \left[\cos\left(\begin{array}{c}pd_i(y) \cdot \frac{|x|-|x_{i-1}(y)|\operatorname{sgn}(x)}{x_{rgi}(y)} \cdot \\ 2\pi - ph(y)_i \cdot 2\pi \\ \cos(ph_i(y) \cdot 2\pi)\end{array}\right) - \right] \cdot \\ [u(|x|-|x_{i-1}(y)|\operatorname{sgn}(x)) - u(|x|-|x_i(y)|\operatorname{sgn}(x))]\right\} + $$

$$\sum_{j=1}^{n}\left\{z_{rgi}(x) \cdot \left[\cos\left(\begin{array}{c}pd_j(x) \cdot \frac{|y|-|y_{j-1}(x)|\operatorname{sgn}(y)}{y_{rgi}(x)} \cdot \\ 2\pi - ph_j(x) \cdot 2\pi \\ \cos(ph_j(x) \cdot 2\pi)\end{array}\right) - \right] \cdot \\ [u(|y|-|y_{j-1}(x)|\operatorname{sgn}(y)) - u(|y|-|y_j(x)|\operatorname{sgn}(y))]\right\}$$

wherein $z(x, y)$ is a z axial vector height of the curved surface at $(x, y)$, $(x, y)$ is a coordinate point within the aperture stop, and
$x_{-max}(y) \leq x(y) \leq x_{+max}(y)$, $y_{-max}(x) \leq |y(x)| \leq y_{+max}(x)$, $x_{-max}(y)$, $x_{+max}(y)$, $y_{-max}(x)$, $y_{+max}(x)$ are outer boundary functions of the aperture stop, $z_{rgi}(y)$ is an x axial amplitude of the ith cosine curved line segment at y, $x_{rgi}(y)$ is a length of the ith cosine curved line segment at y, $|x_i(y)|$ is the absolute value of the outer end point of the ith cosine curved line segment at y, $pd_i(y)$ is an x axial periodic coefficient of the ith curved surface segment at y, $ph_i(y)$ is an x axial initial phase coefficient of the ith curved surface segment at y, c is the curvature of a basic spherical surface, $u(|x|-|x_i(y)|\operatorname{sgn}(x))$ is a combination of two step functions which are $u(x-x_i(y))$ while $x_i(y)>0$ and $u(x+x_i(y))$ while $x_i(y)<0$, m is the number of the divided segments of the curved surface along the positive direction of x axis, i is the sequence number of the segment, $\operatorname{sgn}(x)$ is a sign function;

in y axis direction, $z_{rgj}(x)$ is an axial amplitude of the jth cosine curved line segment at x, $y_{rgj}(x)$ is a length of the jth cosine curved line segment at x, $|y_j(x)|$ is the absolute value of the y coordinate of the outer end point of the jth cosine curved line segment at x, $pd_j(x)$ is a periodic coefficient of the jth curved surface segment at x, $ph_j(x)$ is an initial phase coefficient of the jth curved surface segment at x, $u(|y|-|y_j(x)|\operatorname{sgn}(y))$ is a combination of two step functions which are $u(y-y_j(x))$ while $y_j(x)>0$ and $u(y+y_j(x))$ while $y_j(x)<0$, n is the number of the divided segments of the curved surface along the positive direction of y axis, j is the sequence number of the segment, $\operatorname{sgn}(y)$ is a sign function.

20. The device for acquiring equally blurred intermediate images of claim 1, wherein the surface of the phase mask is a curved surface $$z(r, \varphi) = k(\varphi)f\left(\frac{r}{l(\varphi)}\right)[u(\varphi + \pi) - u(\varphi)],$$

which is constructed by rotating a curved line of discrete curvatures or a compound line of discrete and continuous curvatures $z(r)=f(r)\operatorname{sgn}(r)$, which is odd symmetric with respect to the z axis, by 180°, wherein, $\operatorname{sgn}(r)$ is a sign function, $u(\phi)$ is a step function, $0 \leq \phi < \pi$, $k(\phi)$, $l(\phi)$ are scaling coefficient functions with $\phi$ as a variable.

21. The device for acquiring equally blurred intermediate images of claim 1, wherein the surface of the phase mask is a curved surface $$z_{ty}(x, y) = k(y)f\left(\frac{x}{l(y)}\right)m(x)g\left(\frac{y}{n(x)}\right),$$

which is constructed on the basis of curved lines $z(x)=f(x)=-f(-x)$ and $z(y)=g(y)=-g(-y)$, said lines have discrete curvatures or a compound of discrete and continuous curvatures and are odd symmetric within the xoz and yoz planes respectively, wherein, $k(y)$, $l(y)$, $m(x)$, $n(x)$ are scaling coefficient functions with y, x as variables.

22. The device for acquiring equally blurred intermediate images of claim 21, wherein the focal point structure of the device, within sections in the xoz and yoz planes, is a discrete track or a combination of partly continuous track and partly discrete track, and is shaped to have a characteristic of a character "/\".

23. The device for acquiring equally blurred intermediate images of claim 22, wherein the surface of the phase mask comprises a discrete curvature curved surface constructed on the basis of a discrete curvature curved line, or a curved surface constructed based on combination of discrete curvature curved line segments and continuous curvature curved line segments.

* * * * *

UNITED STATES PATENT AND TRADEMARK OFFICE
CERTIFICATE OF CORRECTION

PATENT NO. : 8,390,932 B2  Page 1 of 1
APPLICATION NO. : 13/025714
DATED : March 5, 2013
INVENTOR(S) : Wei Jia et al.

It is certified that error appears in the above-identified patent and that said Letters Patent is hereby corrected as shown below:

Title Page, No. (30), Foreign Application Priority Data is incorrect. It should read:
Foreign Application Priority Data  -- Aug. 15, 2008 (CN) ................... 2008 1 0118437.X
May 13, 2009 (CN) ................... 2009 1 0136679.6 --

Signed and Sealed this
Twentieth Day of August, 2013

Teresa Stanek Rea
*Acting Director of the United States Patent and Trademark Office*